United States Patent [19]

Glance et al.

[11] Patent Number: 5,461,685
[45] Date of Patent: Oct. 24, 1995

[54] OPTICAL PASSBAND FILTER

[75] Inventors: Bernard Glance, Colts Neck; Robert W. Wilson, Holmdel, both of N.J.

[73] Assignee: AT&T IPM Corp., Coral Gables, Fla.

[21] Appl. No.: 138,659

[22] Filed: Oct. 18, 1993

[51] Int. Cl.$^6$ .................... G02B 6/28; G02B 6/34
[52] U.S. Cl. .................... 385/24; 385/37; 385/27; 385/46; 359/127; 359/130
[58] Field of Search .................... 359/589, 634, 359/124, 127, 129, 130; 385/24, 37, 27, 46

[56] References Cited

U.S. PATENT DOCUMENTS

| 5,002,350 | 3/1991 | Dragone | 385/24 |
|---|---|---|---|
| 5,136,671 | 8/1992 | Dragone | 385/46 |
| 5,339,157 | 8/1994 | Glance et al. | 385/24 |
| 5,373,516 | 12/1994 | Glance et al. | 372/20 |
| 5,373,517 | 12/1994 | Dragone et al. | 372/20 |

*Primary Examiner*—Brian Healy
*Attorney, Agent, or Firm*—Stuart H. Mayer

[57] ABSTRACT

An optical passband filter having a frequency transition that is several of orders of magnitude narrower than prior optical filters includes two frequency routing devices. The first frequency routing device has one input for receiving the input signal and at least N outputs, where N corresponds to the number of frequencies that compose the input signal. The N outputs of the first frequency routing device are each coupled to inputs of a second frequency routing device. The outputs of the second frequency device each correspond to one of the selected output frequency bands into which the input signal is to be divided. A multiplexed input signal containing several different frequency channels is divided into bands that are each directed to respective outputs of the second frequency routing device. The frequency transition between the various bands may be as small as the frequency resolution between adjacent outputs of the first frequency routing device.

6 Claims, 4 Drawing Sheets

5,461,685

OPTICAL PASSBAND FILTER

CROSS-REFERENCE TO RELATED APPLICATIONS

This application is related to application Ser. No. 19,961 of Bernard Glance and Robert Wilson, entitled "Rapidly Tunable Integrated Optical Filter", filed on Feb. 19, 1993, now U.S. Pat. No. 5,339,157.

This application is related to application Ser. No. 19,957 of Bernard Glance and Robert Wilson, entitled "Rapidly Tunable Wideband Integrated Optical Filter", filed on Feb. 19, 1993, pending.

This application is related to application Ser. No. 19,951 of Bernard Glance and Robert Wilson, entitled "Rapidly Tunable Wideband Integrated Laser" filed on Feb. 19, 1993, now U.S. Pat. No. 5,373,516.

This application is related to application Ser. No. 19,952 of Corrado Dragone and Ivan Kaminow, entitled "Rapidly Tunable Integrated Laser" filed on Feb. 19, 1993, now U.S. Pat. No. 5,373,517.

1. Technical Field

This invention relates to optical communications systems. More particularly, this invention relates to optical passband filters used in optical communications systems.

2. Background

The capacity and speed of communications systems may be increased by transmitting information in optical form over networks composed of optically transmissive nodes, fibers, and the like. High capacity optical communications systems require that many optical signals be frequency division multiplexed in the components of an optical network. Receivers must be configured such that a desired optical frequency or band of frequencies may be retrieved from a group of many optical frequencies. This necessitates the provision of suitable optical filters such as an optical passband filter for dividing a multiplexed signal composed of a large band of frequencies into one or more sub-bands of frequencies. Until now, there has been no convenient approach to dividing a band of optical frequencies while providing a sharp transition between the pass band and the stop band. The performance of prior optical passband filters has been limited because of the relatively large frequency transition between the pass and stop bands.

SUMMARY

In accordance with this invention, an optical passband filter has been developed. The optical filter in accordance with this invention may be based upon photonic integrated circuitry which can provide very sharp transition between the various passbands which can be realized at a cost lower than that associated with implementing prior optical filters.

In one example of the invention, Applicants have realized that integrated optical multiplexers and demultiplexers disclosed, for example, in U.S. Pat. Nos. 5,002,350 and 5,136,671 may be used to create a monolithic optical passband filter having a frequency transition that is several of orders of magnitude narrower than prior optical filters. In specific terms, this example of the invention comprises two frequency routing devices. The first frequency routing device has one input for receiving the input signal and at least N outputs, where N corresponds to the number of frequencies that compose the input signal. The N outputs of the first frequency routing device are each coupled to inputs of a second frequency routing device. The outputs of the second frequency device each correspond to one of the selected output frequency bands into which the input signal is to be divided. A multiplexed input signal containing several different frequency channels is divided into bands that are each directed to respective outputs of the second frequency routing device. The frequency transition between the various bands may be as small as the frequency resolution between adjacent outputs of the first frequency routing device. If the frequency routing devices disclosed in the above-mentioned patents are employed, this transition may be as sharp as 30 dB over 50 GHz.

This is only an example of the invention. The full scope of the invention entitled to an exclusionary right is set forth in the claims at the end of this application.

DETAILED DESCRIPTION

Figure 1:
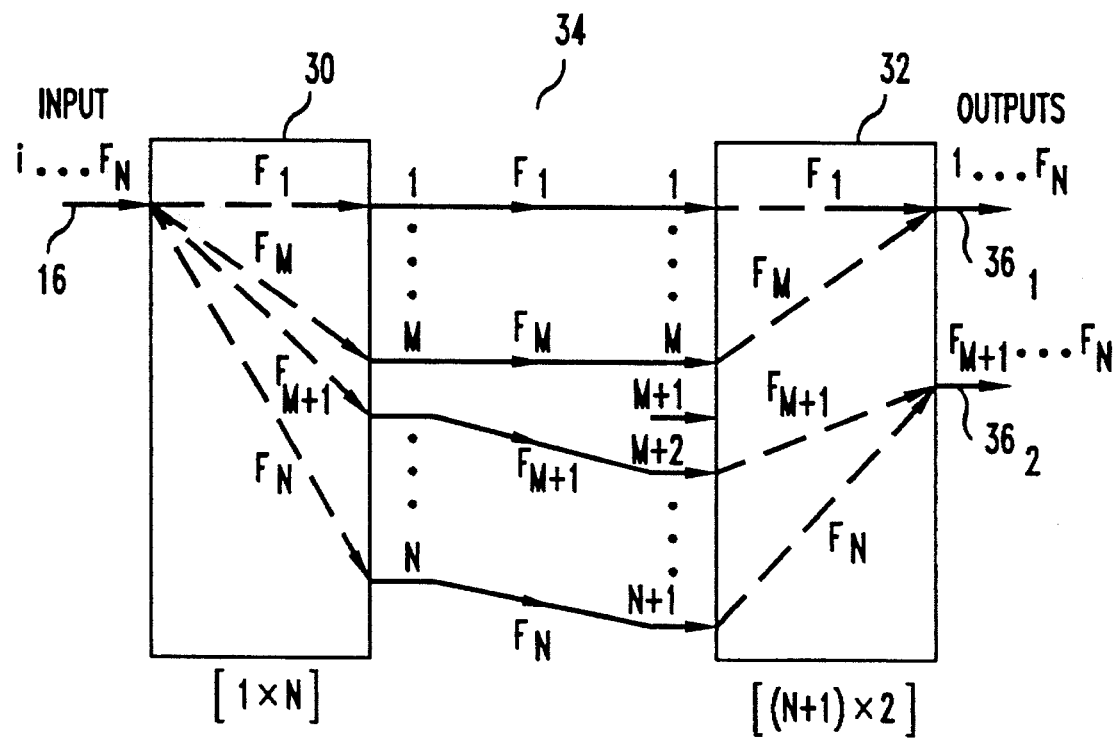
FIG. 1 is a diagram of an example of an optical passband filter in accordance with this invention.

FIG. 1 shows an example of the optical passband filter of the present invention. It is composed of two frequency routing devices 30 and 32 coupled by waveguides. These structures may be monolithically integrated on a semiconductive wafer. They may be created by known photolithographic techniques.

The frequency routing devices employed in the present invention operate as multiplexers and demultiplexers of optical frequencies. The details of their construction and operation are more fully described in U.S. Pat. No. 5,136,671 to Dragone, the entire contents of which is hereby incorporated by reference into this application. Before the optical passband filter of the present invention is described, the pertinent features of the frequency routing devices will be reviewed.

Figure 2:
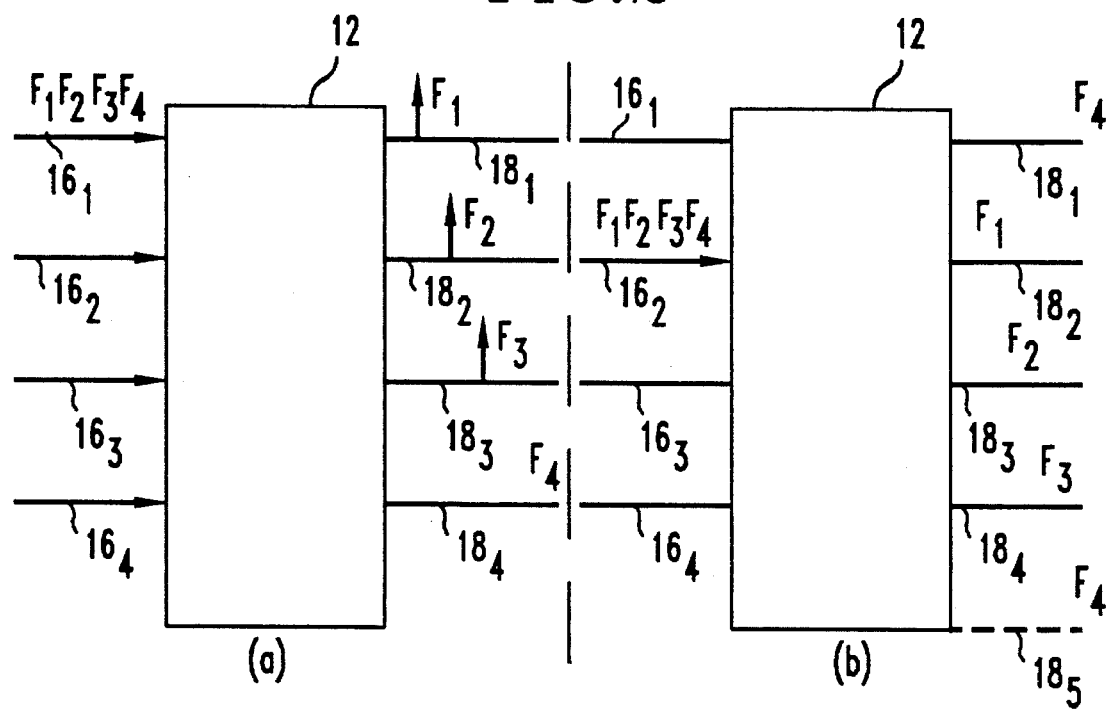
FIGS. 2(a) and 2(b) are diagrams of the frequency routing devices employed in the optical passband filter of this invention.

FIGS. 2(a) and (b) show a functional illustration of a routing device 12 of the type employed in the present invention. In general, the routing device may have N input waveguides and M output waveguides to form an N×M frequency routing device. For example, the routing device 12 shown in FIG. 1(a) has four input waveguides $16_1$, $16_2$, $16_3$, $16_4$, and four output waveguides $18_1$, $18_2$, $18_3$, $18_4$. The routing device 12 will demultiplex input optical frequencies directed to any of its input waveguides. For example, as seen in FIG. 2(a), if a multiplexed signal composed of frequencies $F_1$, $F_2$, $F_3$, $F_4$, is directed to the first input waveguide $16_1$ of the routing device 12, frequency $F_1$ will be directed to output waveguide $18_1$, frequency $F_2$ will be directed to output waveguide $18_2$, frequency $F_3$ will be directed to output waveguide $18_3$, and frequency $F_4$ will be directed to output waveguide $18_4$.

FIG. 2(b) illustrates the manner in which an optical signal is demultiplexed if it is directed to the second input waveguide $16_2$ rather than the first input waveguide $16_1$. In this case frequency $F_1$ will be directed to output waveguide $18_2$, frequency $F_2$ will be directed to output waveguide $18_3$, frequency $F_3$ will be directed to output waveguide $18_4$, and frequency $F_4$ will be directed back up to output waveguide $18_1$ since the routing device 12 only has four output waveguides. If the routing device 12 is provided with a fifth output waveguide $18_5$ (shown in dashed lines in FIG. 2(b)) to form a 4×5 routing device, frequency $F_4$ will appear on this fifth output waveguide instead of on the first output waveguide $18_1$.

Figure 3:
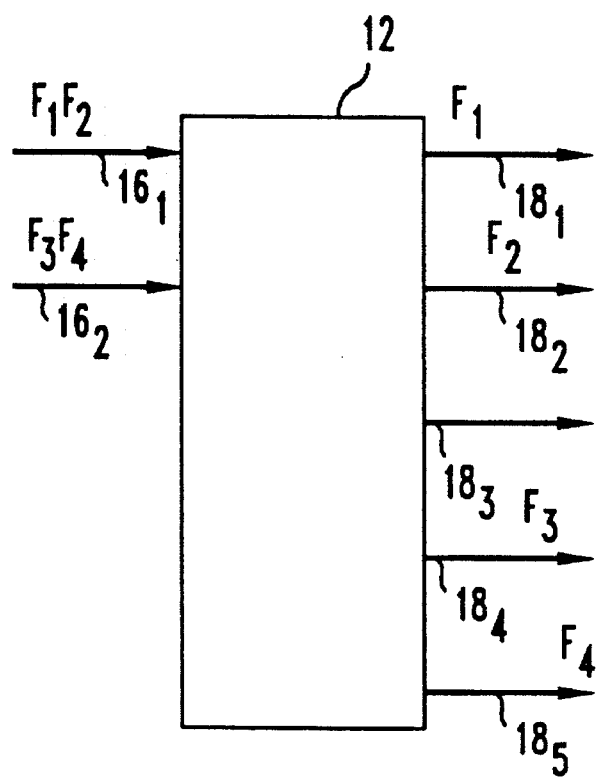
FIG. 3 is a diagram of a frequency routing device such as shown in FIG. 2 in which a signal composed of frequencies $F_1$ and $F_2$ are input to a first input waveguide and a signal composed of frequencies $F_3$ and $F_4$ are input to a second input waveguide.

FIG. 3 shows a 2×5 routing device in which a signal composed of frequencies $F_1$ and $F_2$ is directed to input waveguide $16_1$ and a signal composed of frequencies $F_3$ and $F_4$ is directed to input waveguide $16_2$. Based on the properties of the routing device 12 described in connection with FIGS. 2(a) and 2(b), the routing device of FIG. 3 will demultiplex the signals directed to input waveguides $16_1$ and $16_2$ as shown. Specifically, as expected from FIG. 2(a), frequencies $F_1$ and $F_2$ will be directed to output waveguides $18_1$ and $18_2$, respectively. Similarly, as expected from FIG. 1(b), frequencies $F_3$ and $F_4$ will be directed to output waveguides $18_4$ and $18_5$, respectively. It should be noted that no input frequency is directed to output waveguide $18_3$.

The routing devices discussed above are symmetrical in operation. Therefore, if in connection with the routing device shown in FIG. 3 frequencies $F_1$, $F_2$, $F_3$, $F_4$ are directed to waveguides $18_1$, $18_2$, $18_4$, and $18_5$, respectively (which now function as input waveguides), frequencies $F_1$ and $F_2$ will be output on waveguide $16_1$ and frequencies $F_3$ and $F_4$ will be output on waveguide $16_2$.

Returning to FIG. 1, the optical passband filter 34 of the present invention is composed of two frequency routing devices 30 and 32. The first routing device 30 in which the input signal to be frequency divided is directed is a 1×N routing device, where N is the number of frequencies contained in the multiplexed input signal. The second routing device 32 in which the divided frequency bands are output is an (N+1)×2 routing device. The first set of M output waveguides of the first routing device 30 are each coupled in consecutive order to the first M input waveguides of the second routing device 32. The remaining set of (N−M) output waveguides of the first routing device 32 are each coupled in consecutive order to the remaining input waveguides of the second routing device beginning with the (M+2) input waveguide (i.e., the (M+1) output waveguide of the first routing device is coupled to the (M+2) output waveguide of the second output device). In other words, the (M+1) input waveguide of the second output device is not coupled to the first routing device 30, thus shifting the second set of output waveguides from the first routing device 30 by one relative to the input waveguides of the second input device 32.

Figure 4:
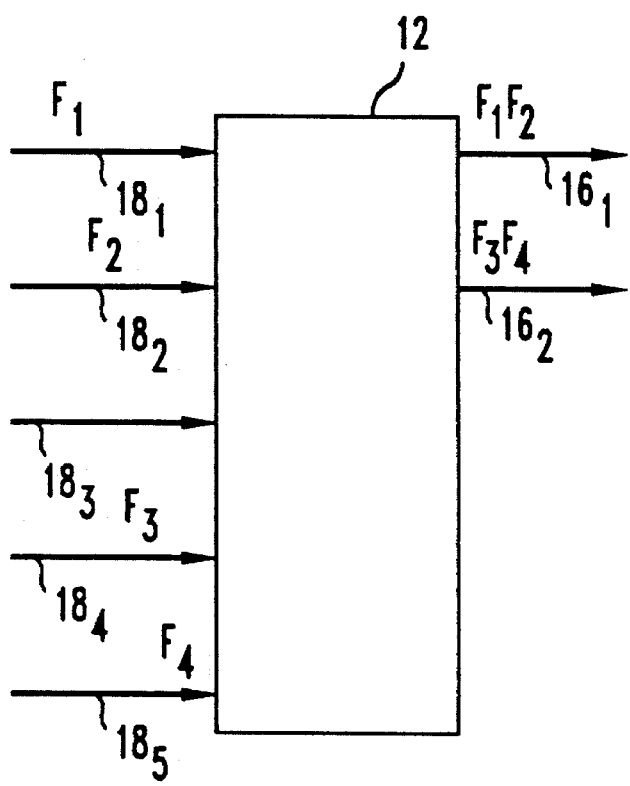
FIG. 4 is a diagram of the frequency routing device shown in FIG. 3 in which the input and output waveguides are reversed.

The manner in which the passband filter 34 operates is most easily understood by recognizing that the second routing device 32 is configured similar to the routing device depicted in FIG. 3 when operating in reverse mode (i.e., when waveguides $18_1$–$18_5$ in FIG. 3 are employed as input waveguides and waveguides $16_1$ and $16_2$ are employed as output waveguides). For the sake of clarity, FIG. 4 shows the routing device of FIG. 3 operating in its reverse mode.

Returning to FIG. 1, the first routing device 30 demultiplexes the input frequencies $F_1 \ldots F_N$ such that the individual frequencies are consecutively directed to its N output waveguides. The demultiplexed frequencies $F \ldots F_N$ are directed to the inputs of the second routing device 32 in the order described above and shown in FIG. 1. The second routing device 32 then multiplexes the frequencies $F_1 \ldots F_N$ just as depicted in FIG. 4; the first $F_M$ frequencies appear on the fast output line $36_1$ and the second $F_{(M+1)} \ldots F_N$ frequencies appear on the second output line $36_2$.

Accordingly, the net result produced by the two routing devices 30 and 32, which form the optical passband filter 34, is that the multiplexed signal composed of frequencies $F_1 \ldots F_N$ is divided into two signals, the first composed of frequencies $F_1 \ldots F_M$, and the second composed of frequencies $F_{(M+1)} \ldots F_N$.

Figure 5:
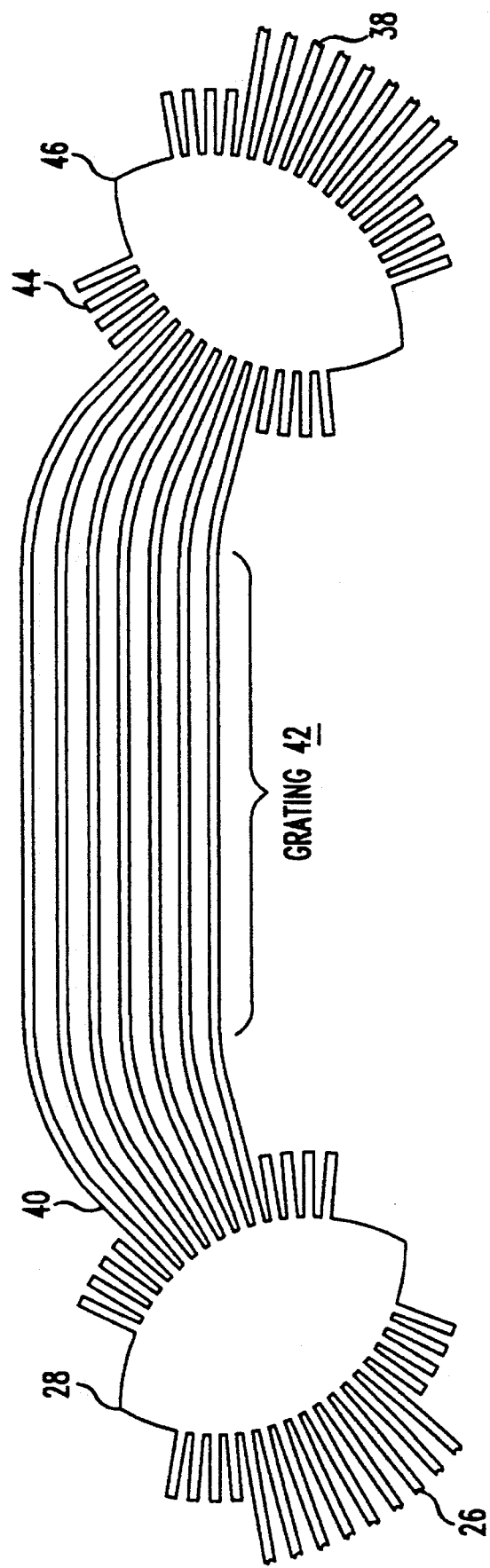
FIG. 5 is a diagram illustrating the details of the frequency routing devices shown in FIG. 1.

FIG. 5 shows the pertinent details of each routing device 30 and 32 shown in FIG. 1. Both of those devices may have identical configurations except for, possibly, the differing numbers of input and output waveguides that are employed. Each frequency routing device contains a plurality of input waveguides 26 connected to a free space region 28. A plurality of output waveguides 40 extends from the free space region 28 and is connected to an optical grating 42. The optical grating 42 comprises a plurality of unequal length waveguides which provides a predetermined amount of path length difference to a corresponding plurality of input waveguides 44 connected to another free space region 46. The free space region 46 is connected to a plurality of output waveguides 38. These frequency routing devices operate as multiplexers and demultiplexers of optical frequencies. As noted above, details of their construction and operation are more fully described in the U.S. Pat. No. 5,136,671 to Dragone. In the case of the frequency routing device 30 seen in FIG. 1, the input waveguide 16 corresponds to one of the input waveguides 26 shown in FIG. 5. In the case of the frequency routing device 32 seen in FIG. 1, the output waveguides $36_1$ and $36_2$ correspond to two of the output waveguides 38 shown in FIG. 5.

Figure 6:
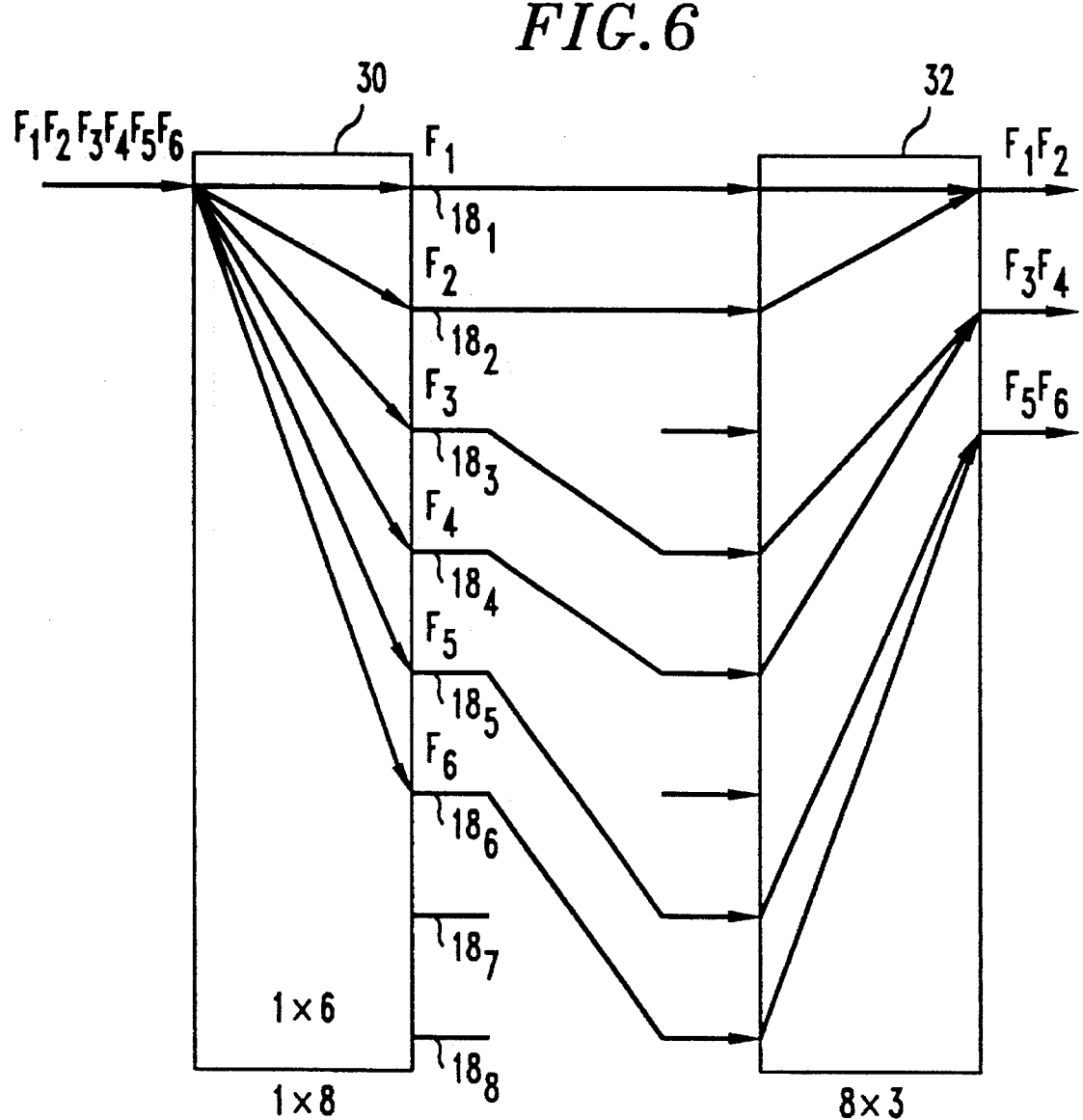
FIG. 6 is a diagram of an alternative example of an optical passband filter in accordance with this invention.

The above-described embodiment of the present invention can be generalized to divide an input signal into more than two frequency bands. In the generalized case, if W is the number of frequency sub-bands into which the input signal is to be divided, the second routing device 32 must have at least (W−1) additional input waveguides relative to the number of input waveguides of the first routing device 30. FIG. 6 shows an example of an optical bandpass filter for dividing a signal into three sub-bands (i.e., W=3). In this case the first routing device 30 has six output waveguides $18_1, 18_2, \ldots, 18_6$, and thus the second routing device 32 must have eight input waveguides.

In a preferred embodiment of the invention, the number of output waveguides of the first routing device is equal to the number of input waveguides of the second routing device. In particular, if the passband filter is to divide a signal into W frequency sub-bands and the number of multiplexed frequencies forming the input signal is N (so that the first routing device must have at least N output waveguides), the second routing device must have N+(W− 1) input waveguides. While in this case the first routing device is only required to have N output waveguides, the complexity of the device is significantly reduced if it is instead provided with N+(W−1) output waveguides, where the additional W−1 waveguides are unused. By employing such a configuration, the width Δf of the passband directed to each of the N output waveguides of the first routing device will be equal to the width Δf of the passband that may be directed to each of input waveguides of the second routing device over the entire free spectral range period $N \Delta f$. In the example of the invention shown in FIG. 6, the number of output waveguides of the first routing device and the number of input waveguides of the second routing device are both equal to eight, where the final two input waveguides $18_7$ and $18_8$ of the fast routing device are unused.

We claim:

1. An optical passband filter comprising:

an input frequency routing device having an input for receiving a signal composed of a plurality of multiplexed optical frequencies; and an output frequency routing device responsive to the input frequency routing device, said output frequency routing device having a first and a second output, whereby some of said multiplexed optical frequencies are directable to the first output and the rest of said multiplexed optical frequencies are directable to the second output.

2. The filter of claim 1 wherein said input frequency routing device has at least N outputs, N>1, each of said N outputs corresponding to one of the plurality of multiplexed optical frequencies and wherein said output frequency routing device has a plurality of outputs such that said plurality of multiplexed optical frequencies are dividable into a plurality of selected output frequency bands each corresponding to one of said plurality of outputs, and further comprising:

a plurality of waveguides coupling said outputs from the input frequency routing device to N inputs of the output frequency routing device, said output device having a total number of inputs equal to N+W−1, where W is the number of selected frequency bands into which the multiplexed optical frequencies are to be divided.

3. The filter of claim 2 wherein each of the plurality of waveguides has a first end coupled to a respective one of the outputs from the input frequency routing device and a second end coupled to a respective one of the inputs of the output routing device such that said output frequency routing device has W−1 uncoupled inputs uncoupled to any of said at least N outputs of the input frequency routing device, whereby each of said uncoupled inputs corresponds to a frequency at which said plurality of multiplexed optical frequencies is divided into one of said plurality of selected output frequency bands.

4. The filter of claim 2 wherein the input frequency routing device has N+W−1 outputs.

5. The filter of claim 3 wherein the input frequency routing device has N+W−1 outputs.

6. An optical passband filter comprising:

an input frequency routing device having an input for receiving a signal composed of a plurality of multiplexed optical frequencies; and an output frequency routing device responsive to the input frequency routing device, said output frequency routing device having a plurality of outputs, said plurality of multiplexed optical frequencies being divided into a plurality of selected output frequency bands each corresponding to one of said plurality of outputs.

* * * * *